United States Patent [19]
Smith et al.

[11] Patent Number: 5,711,820
[45] Date of Patent: Jan. 27, 1998

[54] METHOD TO SEPARATE AND RECOVER OIL AND PLASTIC FROM PLASTIC CONTAMINATED WITH OIL

[75] Inventors: Henry M. Smith, Overland Park, Kans.; George W. Bohnert, Harrisonville, Mo.; Ronald B. Olson, Kansas City, Mo.; Thomas E. Hand, Lee's Summit, Mo.

[73] Assignee: Allied Signal, Inc., Morristown, N.J.

[21] Appl. No.: 603,009

[22] Filed: Feb. 16, 1996

Related U.S. Application Data

[63] Continuation of Ser. No. 359,590, Dec. 20, 1994, abandoned.

[51] Int. Cl.$^6$ .................................................. C02F 1/46
[52] U.S. Cl. ........................ 134/12; 134/40; 134/22.18
[58] Field of Search ................... 134/12, 40, 22.18, 134/22.12

[56] References Cited

U.S. PATENT DOCUMENTS

| | | | |
|---|---|---|---|
| 4,061,566 | 12/1977 | Modell | 210/32 |
| 4,434,028 | 2/1984 | Eppig | 196/14.52 |
| 4,601,906 | 7/1986 | Shindler | 424/195.1 |
| 5,013,366 | 5/1991 | Jackson | 134/1 |
| 5,304,253 | 4/1994 | Grant | 134/12 |
| 5,316,591 | 5/1994 | Chao | 134/34 |
| 5,377,705 | 1/1995 | Smith | 134/95.3 |

OTHER PUBLICATIONS

M.A. McHugh et. al., "Supercritical Fluid Extraction," Butterworth Publishers, Stoneham, MA 02180, 1986, pp. 181–198.

*Primary Examiner*—Sam Silverberg
*Attorney, Agent, or Firm*—Shook, Hardy & Bacon L.L.P.

[57] ABSTRACT

The present invention provides a method to separate and recover oils and recyclable plastic from plastic contaminated with oil. The invention utilizes the different solubility of oil in as liquid or supercritical fluid as compared to a gas to effect separation of the oil from the plastic.

1 Claim, 3 Drawing Sheets

1

METHOD TO SEPARATE AND RECOVER OIL AND PLASTIC FROM PLASTIC CONTAMINATED WITH OIL

This application is a continuation of application Ser. No. 08/359,590 filed Dec. 20, 1994 abandoned.

The U.S. Government has rights in this invention pursuant to contract number DE-AC04-76-DP00613 with the United States Department of Energy.

FIELD OF THE INVENTION

The present invention relates generally to the use of carbon dioxide in a liquid or supercritical state for separating and recovering separately oils and plastics from plastics contaminated with oils.

BACKGROUND OF THE INVENTION

Traditionally, plastic contaminated with oil such as used motor oil containers have been difficult to recycle. Removal of the oil from the plastic has been difficult, expensive and prone to create additional waste byproducts.

Recycling of motor oil containers is illustrative of the problem. Motor oil containers typically are high-density polyethylene (HDPE) which lends itself well to recycling if it is sufficiently clean. However, residual oil coating the interior surface of the "empty" motor oil containers constitutes a contaminant that prevents use of the containers as high grade plastics. Based upon measurement of samples of used motor oil containers, this residual oil coating appears to average 4.6 percent of the weight of the used plastic container and can represent as much as 20 percent of the container weight. Estimates are that over one billion one quart plastic containers were filled with motor oils in the United States in 1993. If 4.6 percent by weight of those containers is motor oil, the one billion empty plastic containers represent approximately 160 million pounds of plastic and over 7 million pounds of motor oil that could be recovered for reuse if an appropriate separation method were available. However, because the motor oils have not been easily separated from the plastic containers, the vast majority of these containers are currently disposed of in landfills, leaking oils into the soil and groundwater, and occupying significant landfill volume.

Current available options to landfilling the waste plastics include (a) grinding the containers and using them in other plastic recycling processes on a very limited (dilute) basis; (b) using an aqueous process to displace the oil from the plastic; (c) using a halogenated solvent to dissolve/dilute the oil; or (d) using a combustible or flammable solvent to dissolve/dilute the oil from the plastic.

The problems with these options are as follows:

a. Existing recyclers in the United States can blend limited quantities of oil contaminated plastics in recycled plastic products. Large quantities cannot be blended because of the undesirable effects of the residual oil on the recycled plastic properties. Examples include "plastic lumber" and lower grade plastic products.

b. Aqueous processes can be used to displace the oil from the plastic. However, detergents and/or surfactants are required to assist displacement of the oils. A stream of usable oil-free plastic will be generated by this method; however, the displaced oil will be contaminated or changed chemically and additional processing will be needed to separate it from the aqueous solutions. The aqueous solutions themselves will be a secondary waste stream that will require treatment before being recycled or discharged as waste water.

c. Halogenated solvents can be used to dissolve/dilute the oils from the plastic. Again, usable plastic will be obtained by this process if the solvents do not extract essential components from the plastic. The halogenated solvent solutions will require distillation to recover the oils and recycle the solvents. In general, it is difficult to fully reclaim usable oil from the distillate. Furthermore, many halogenated solvents are ozone depleting compounds and potential health hazards to humans, and therefore their use and release into the environment are under regulation and close scrutiny by federal and state governments.

d. Combustible or flammable solvents may be used to dissolve and/or displace the oil from the plastic. Usable plastic can be generated by this method if the solvents do not extract essential components from the plastic. The combustible or flammable solvent solutions will require distillation to recover the oils and recycle the solvents. Only distillation equipment suitable for combustible or flammable solvents may be used and even then fire safety concerns will be significant. As in the case of the use of halogenated solvents, the oil may not be fully recoverable from the distillation.

The present methods described above can provide some usable plastic from oil-contaminated plastics. However, they will provide usable oil only at the expense of a secondary waste stream that itself will require treatment and additional expense. The recycling of plastic and oil from "empty" plastic oil containers presents serious environmental and waste stream disposal problems if conventional organic or aqueous solvents are used for the separation of the plastic and oil. Discarding of the containers as landfill waste also presents environmental problems in that the residual oil may eventually leach into soil and groundwater. Canada and some U.S. States are considering a ban on the disposal of these containers in landfills.

The method proposed by this invention solves these problems. It will produce two usable products, oil-free plastic and virgin oil, without the creation of any secondary waste stream. These products are produced in a single process that simultaneously regenerates the solvent carbon dioxide for continual reuse. Thus, the present invention provides a method to avoid all the environmental and waste solvent disposal problems and, in addition, provides a method for the complete recovery of both the virgin oil and the plastic for further use.

DESCRIPTION OF THE INVENTION

Figure 1:
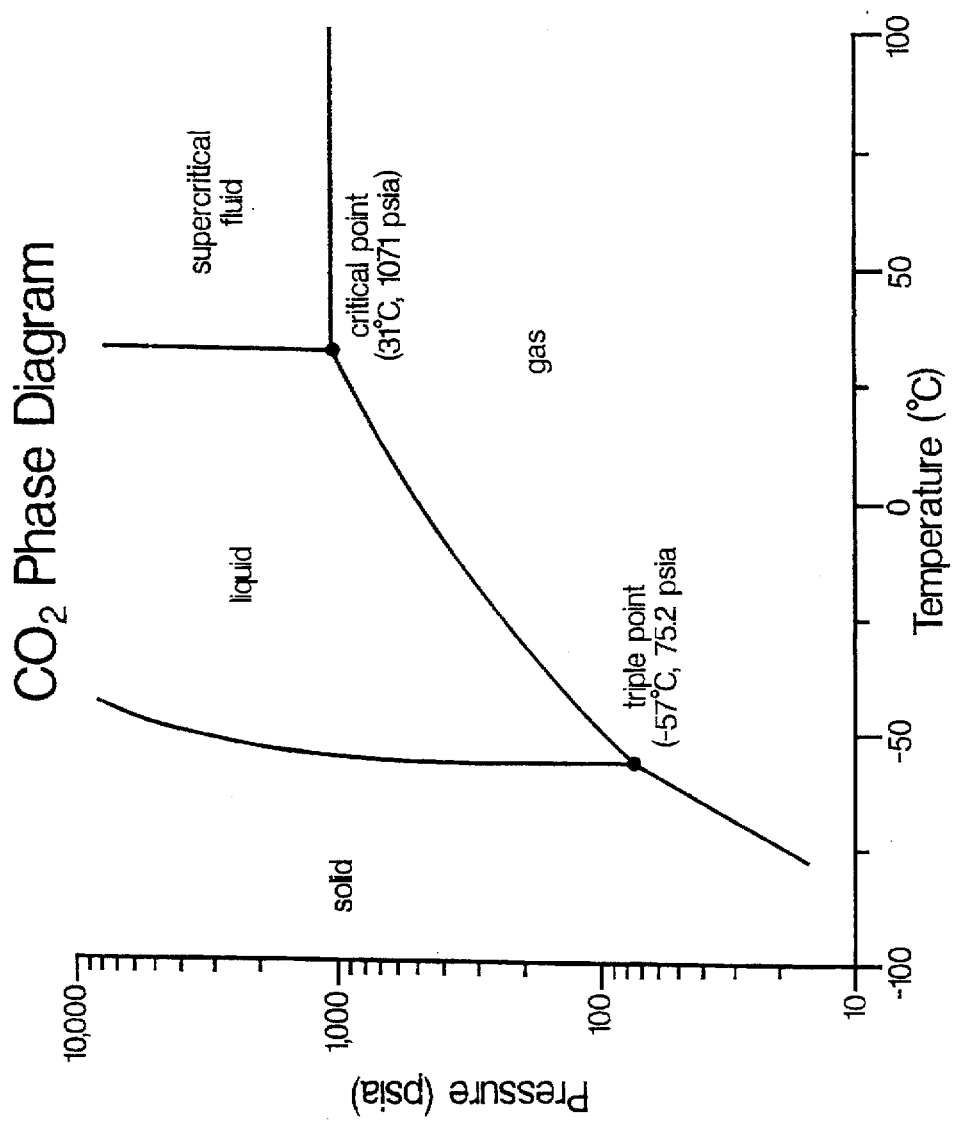
FIG. 1 Phase Diagram of Carbon Dioxide

The present invention is a process for separating oil and plastic from plastic contaminated with oil comprising the steps of contacting the plastic contaminated with oil with a fluid, preferably carbon dioxide, which fluid is in the liquid or supercritical state so as to dissolve a portion of the oil in the fluid, the selected fluid being a solvent for oil but not a solvent for plastic when the fluid is in a liquid or supercritical state and a non-solvent for oil when said fluid is in the gaseous state; separating the fluid in which a portion of the oil is dissolved from the plastic; adjusting the temperature and pressure of the fluid sufficient to render the fluid a gas and leave the oil a liquid, thereby forming a two-phase system comprised of the fluid and the oil; and separating the resulting two-phase system into the fluid and the oil.

For many reasons, carbon dioxide is the preferred fluid for this invention. The solvent properties of liquid and supercritical carbon dioxide are well known. Buchner demonstrated that the solubility of organics in supercritical carbon dioxide increased with pressure (E. A. Buchner, Z. Physik. Chem. 54, p. 665, 1906). Francis determined the solubility of a great number of organic compounds in liquid carbon dioxide, and found that many were completely miscible (A. W. Francis, J. Phys. Chem. 58, p. 1099, 1954). Further, in recent years the environmental risks, federal and local regulations and waste disposal costs associated with organic and aqueous solvent separation processes has prompted renewed interest in the use of supercritical and liquid carbon dioxide as processing solvents. Carbon dioxide possesses many of the characteristics desired in an "environmentally acceptable" solvent. It is non-toxic, non-flammable, inexpensive, and abundantly available. It can be continually recycled in a closed loop system so that emissions to the atmosphere are minimal. It possesses excellent solubility characteristics for non-polar organic materials such as oils, greases, and solvents. Both liquid and supercritical carbon dioxide have liquid-like densities that contribute to their good solvent properties. The densities can be manipulated to particular values by changes in temperature and pressure, thus varying the solute carrying capacity. Both phases have low viscosities and low surface tensions. Another property of carbon dioxide that is advantageous is that it is not an ozone depleting compound. The critical temperature of 304 degrees Kelvin (31 degrees C.) and critical pressure (72.9 atmospheres, 1071 psia) of carbon dioxide are easily reached in laboratory and production equipment.

There are several known industrial applications of the use of liquid and/or supercritical carbon dioxide as processing solvents. These applications include the extraction of hops (Laws et al, U.S. Pat. No. 4,218,491, Aug. 19, 1980), the extraction of oils from seeds (B. Schindler, U.S. Pat. No. 4,601,906, Jul. 22, 1986), the decaffination of coffee (S. Katz, U.S. Pat. No. 4,820,573, Apr. 11, 1989), the removal of off-flavor from vegetable products (M. Sevenants, U.S. Pat. No. 4,675,198, Jun. 23, 1987), and the precision cleaning of intricate parts and assemblies (D. Jackson, U.S. Pat. No. 5,013,366, May 7, 1991).

The patent entitled "Process Using A Supercritical Fluid For Regenerating Synthetic Organic polymeric Adsorbents And Wastewater Treatment Embodying The Same," (M. Modell, U.S. Pat. No. 4,061,566) discusses utilizing a supercritical fluid, including carbon dioxide, as a solvent to clean a synthetic polymeric adsorbent (typically a low-density styrene derivative) of organic material as part of a wastewater treatment process. The patent entitled "Apparatus For Removing Organic Contaminants From Inorganic-rich Mineral Solids," (C. Eppig, U.S. Pat. No. 4,434,028) discusses utilizing carbon dioxide as a solvent to remove organic contaminants including oil from particulate inorganic-rich mineral solids, such as oil well drilling cuttings. Neither of these utilizes carbon dioxide extraction technology in the novel application to separate oil-contaminated plastics as a waste stream to produce two useful products, uncontaminated oil and plastics.

PREFERRED EMBODIMENT

As noted above, the preferred fluid to practice this invention is carbon dioxide. Therefore, the following discussion of the preferred embodiment focuses upon application of that substance. The liquid and/or supercritical carbon dioxide used in accordance with the present invention are obtained from any combination of temperature and pressure consistent with each phase as shown in the phase diagram for carbon dioxide in FIG. 1. Similarly, the gaseous carbon dioxide is obtained from any combination of temperature and pressure consistent with the gaseous phase as shown in FIG. 1. References to particular temperatures and pressures for any given phase of carbon dioxide are intended to be exemplary but not restrictive to that particular combination of temperature and pressure.

A preferred embodiment of the system is application to plastic oil containers contaminated with motor oil. Reference to motor oil is intended to refer to various crude oil derivatives or artificial lubricating oils suitable for use in automotive applications. The standard plastic oil containers utilized in packaging motor oil are HDPE. Thus, an application and embodiment of this invention is to apply the oil and plastic separation procedures to HDPE containers contaminated with motor oil.

Figure 2:
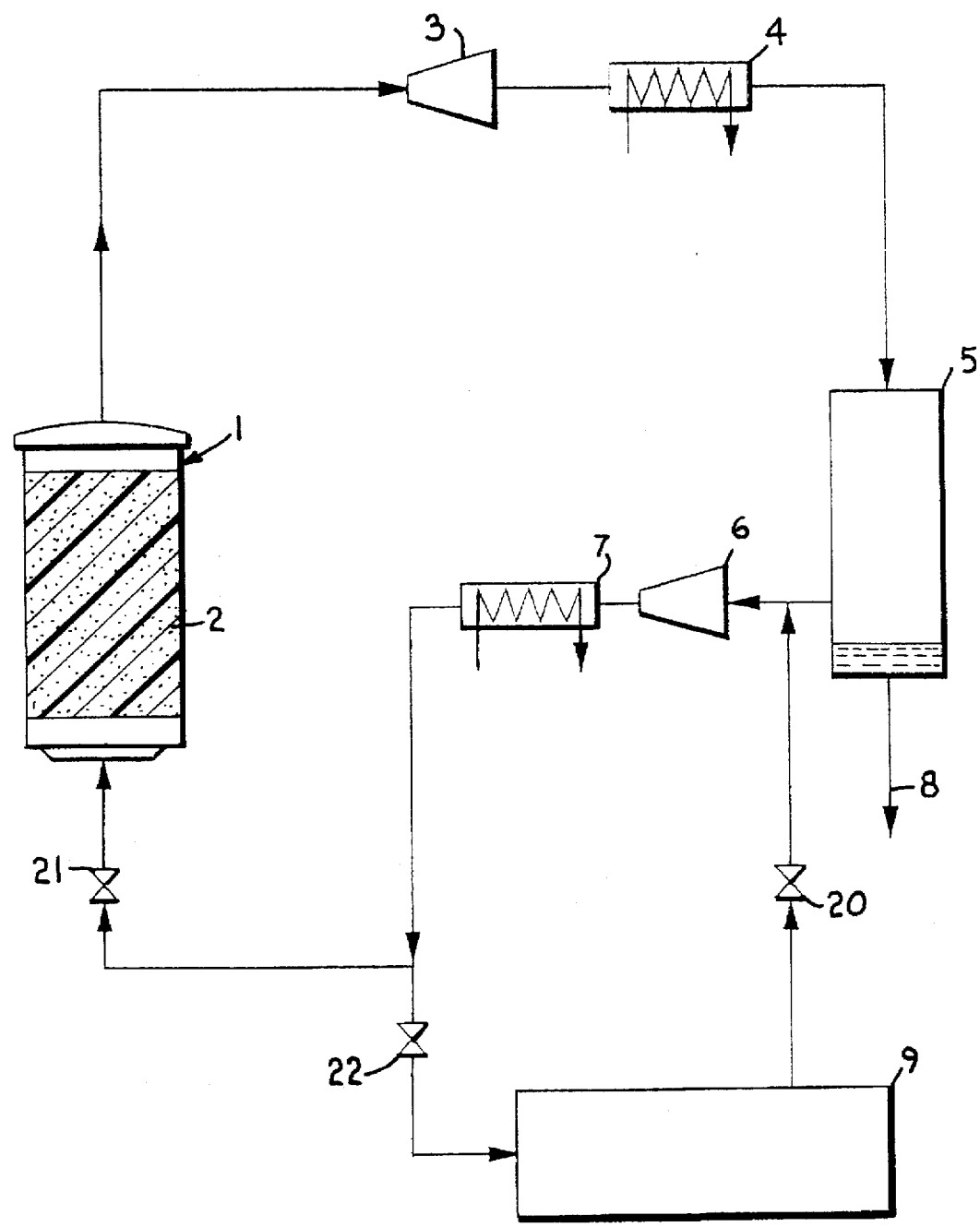
FIG. 2 Closed Loop Carbon Dioxide Separation System

FIG. 2 is a flow diagram of an exemplary closed loop separation system suitable for the separation of plastic and oil in accordance with the present invention. Oil-coated plastic 02, ideally either shredded or in small parts, is placed in the extraction vessel 01. Typically, the material will be enclosed in a steel mesh basket or other porous metal enclosure so that the plastic will not be swept out of the extraction vessel 01 into other portions of the separation system by the flowing carbon dioxide described below. The system is then filled with carbon dioxide from a reservoir 09 through a control valve 20 to a pressure suitable to satisfy the desired pressure and temperature conditions in operation as described further below. With the control valves 20 and 22 shut off, carbon dioxide flow is established from the compressor 06 and associated heat exchanger 07 through control valve 21, through the extraction vessel 01, through the expansion device 03 and associated heat exchanger 04, through separation vessel 05 and to the compressor 06 for another cycle. Adjustments to the compressor 06 speed, expansion device 03, and the temperature of the heat exchangers 07 and 04 allows the extraction vessel 01 and separation vessel 05 to be maintained at the desired pressures and temperatures as described further below. Such adjustments may be made manually or controlled by commercially-available computer software and equipment. Overall charge of the system may be adjusted by admitting more carbon dioxide from reservoir 09 through control valve 20 or by discharging carbon dioxide to the reservoir through control valve 22.

In the extraction vessel, the desired temperature and pressure for solvency of oil in liquid or supercritical carbon dioxide is typically from about 800 to about 5000 psia and from about 20 to about 100 degrees C. The oil-free liquid or supercritical carbon dioxide continuously enters the bottom of the extraction vessel 01 and flows upward past the oil-coated plastic 02, dissolving the oil and flushing it away from the plastic 02. It is of some importance that the flow of carbon dioxide be introduced to the bottom of extraction vessel 01, since the upward flow will tend to fluidize the bed of plastic 02 and hasten dissolution of the oil. The oil-laden carbon dioxide solvent continuously exits from the top of extraction vessel 01 and flows to the expansion device 03 and heat exchanger 04. Expansion device 03 and heat exchanger 04 are set such that the carbon dioxide entering the separator vessel 05 is in the gaseous phase (see FIG. 1); typically from about 400 to about 1000 psia and from about 20 to about 35 degrees C. Under these gaseous conditions, the carbon dioxide has negligible solubility for the oil, and therefore the oil is precipitated out of solution, forming a two-phase system of liquid oil and gaseous carbon dioxide, and the oil collects in the bottom of separator vessel 05. The now oil-free carbon dioxide gas is compressed through the compressor 06 wherein the pressure is raised equal to or greater than that of the extraction vessel 01. The temperature of the carbon dioxide then is adjusted to the desired value as it flows through heat exchanger 07, from where it reenters the extraction vessel 01 as either liquid or supercritical (depending on the pressure and temperature chosen, see FIG. 1) carbon dioxide to again dissolve and flush away oil from the plastic 02. This recirculation of the carbon dioxide solvent is continued until all of the oil has been removed from the plastic and deposited in the separator vessel 05. When the separation of the oil from the plastic is complete, with control valve 21 closed, the clean carbon dioxide is routed into the storage reservoir 09 through control valve 22 to be used again later. The oil-free plastic 02 is removed from the extraction vessel 01, and the oil 08 recovered is drained from the separator vessel 05. The only waste released by this process is the small amount of carbon dioxide gas vented during final depressurization of the extraction vessel 01.

Depending upon the size of the system, cost of energy and other economic and engineering factors, various configurations of heat exchangers 04 & 07 may be appropriate to reduce overall energy required to operate the system. Similarly, use of various configurations of pumps and compressors individually or in combination in place of compressor 06, and/or using a turbine device instead of the expansion device 03 may be economically desirable or technically required in appropriate circumstances.

The choice of whether to use liquid or supercritical carbon dioxide as the separating solvent depends on many variables, especially the oil solubility in each phase, but in general the decision will be made based on economic factors. If the oil solubility is sufficiently high in liquid carbon dioxide, then liquid would be the preferred phase because the capital cost of building a separation system with a pressure rating of 2000 psia or less is significantly smaller than a system that must be pressure rated to 5000 psig or more. Furthermore, the operating costs of the system equipment will be less because of the reduced pressure required for liquid carbon dioxide as compared to supercritical. It should be noted that, based upon the example data below, sufficient solvency for common motor oil generally is present in the liquid phase carbon dioxide.

Figure 3:
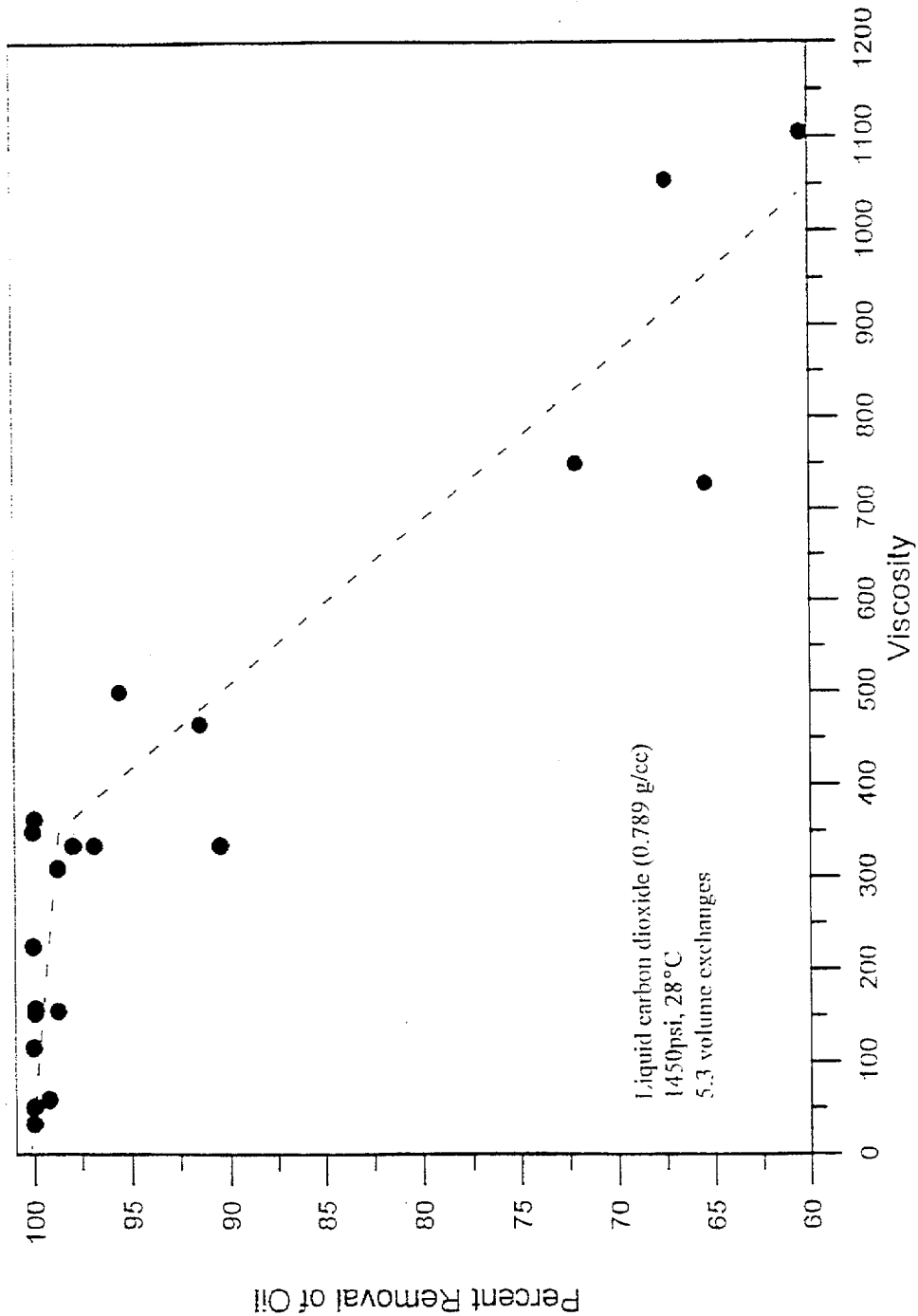
FIG. 3 Graph of Percent Oil Removed versus Oil Viscosity

The viscosity of the oil to be removed from the plastic, and the desired turnaround time or production rate, will have significant impacts on the choice of operating conditions used. Experimental results, as shown in FIG. 3 indicate that oil viscosity, in Saybolt Universal Seconds (SUS), as shown as a reflection of the molecular weight of the oil, has a major effect on the solubility of oil in carbon dioxide. Oils with viscosities ranging from 33 to 750 SUS were placed on inert substrates and subjected to flowing liquid carbon dioxide at 28 degrees C. and 1450 psia. The removals were done in a pressure vessel of approximately 4 liters volume, and a total of 20 liters of liquid carbon dioxide was circulated past each oil coated substrate. A volume of 20 liters, when adjusted for the differences in temperature and pressure before and after the pump, represents approximately 5.3 pressure vessel volume exchanges. Under these conditions, it can be seen from FIG. 3 that, up to a viscosity of about 350 SUS, essentially complete removal of the oils was achieved in 5.3 volume exchanges. At viscosities above 350 SUS, the removal efficiency drops with increasing viscosity, because of the decreasing solubility in liquid carbon dioxide of the higher molecular weight oils. The higher viscosity oils could have been completely removed, of course, but flows greater than 5.3 volume exchanges (i.e., longer times) would be required under these conditions. If minimum production times are required, increasing the temperature and pressure would increase the solubility of these oils and thus expedite removal. For example, we have observed that oils with viscosities up to 1100 SUS can be removed effectively in 5.3 vessel volume exchanges at 75 degrees C. and 4700 psia, conditions well inside the supercritical phase. This increased production rate would come at an increased capital cost and higher operating costs for a system capable of operating at these conditions.

The question of the minimum operating time (or minimum total carbon dioxide flow) to achieve essentially complete oil removal (i.e., over 99.5 percent) may be addressed in a general manner if certain limiting conditions are satisfied. If the oil which is coating the plastic is completely soluble in one pressure vessel volume of carbon dioxide, and if complete homogeneity of the oil/carbon dioxide solution is assumed (i.e.,—ideal turbulent flow conditions) during the flushing/diluting process, then the amount of oil remaining in the pressure vessel is described by the dilution equation shown below:

$$Q_n = Q_o \exp(-n)$$

where $Q_n$ is the amount of oil remaining in the pressure vessel after n pressure vessel volume exchanges, and $Q_o$ is the initial amount of oil on the plastic in the vessel. This equation may be rearranged to describe the percent oil removed:

$$\% \ Removed = (1 - Q_n/Q_o) \times 100 = \{1 - \exp(-n)\} \times 100$$

Use of this equation shows that 5.3 pressure vessel volume exchanges results in 99.50 percent removal of the oil. Eight vessel volume exchanges results in 99.97 percent removal. Thus, it can be seen that under rather ideal conditions of complete solubility and homogeneity, at least 5.3 volume exchanges are required to achieve 99.50 percent removal. Alternatively, if complete solubility of the oil in one vessel volume is again assumed, and if the pressure vessel design and flow characteristics are such that ideal "plug flow" is achieved, then substantially less than 5.3 vessel volume exchanges could be required for essentially complete removal of the oil. In actual practice, conditions are unlikely to be either ideal turbulent or ideal plug flow, but these models do show at least the minimum time or solvent volume that could be required. If the oil is not completely soluble in one vessel volume, then longer times or larger total flows would be necessary for either the turbulent or plug flow model.

It is possible to operate the separator in the supercritical rather than gaseous phase and still obtain good separation of the oil from the carbon dioxide solvent, provided a combination of temperature and pressure are used that result in a relatively low carbon dioxide density. For example, a temperature of 130 degrees C. and a pressure of 1080 psia would provide a density of 0.1125 g/cc for the carbon dioxide. The solubility of oil at this density would be low and thus separation could be achieved. However, there would be little or no advantage in operating at these conditions, and the equipment and operating cost for the separator and associated equipment would be increased significantly.

This discussion is intended to demonstrate that the choice of operating conditions so as to maximize economic return will be complex in any case, and that many factors, such as required operating pressure and temperature and their effect on the system capital cost, oil viscosity and solubility, pressure vessel size and loading, compressor size and speed, power consumption, and desired production rate must be considered and balanced to arrive at the best and most economic configuration for a given separation system.

EXAMPLES

The following non-limiting examples demonstrate the practical utility of the present invention.

For examples 1-3, a representative sample of shredded high density polyethylene one quart-size motor oil containers was obtained from a recycled resin manufacturer. The sample was primarily automobile engine oil containers from a wide variety of commercial oil companies. The shredded high density polyethylene was in the form of "flakes," irregularly shaped pieces approximately 2-8 mm in diameter and approximately 0.5 mm in thickness. In order to determine the average amount of oil coating the flakes, a 377.04 gram sample was washed with four 900 ml aliquots of an aliphatic hydrocarbon solvent mixture ($\sim C_7H_{16}$-$C_{10}H_{22}$), rinsed with two 1000 ml aliquots of denatured ethanol, forced air dried, and finally placed in a vacuum oven at 71 degrees C. for 15 minutes. Relatively low molecular weight linear hydrocarbons were used as the oil-removing solvent in order to avoid extraction and/or swelling of the polyethylene by more aggressive solvents such as toluene or xylene. The weight of the dried polyethylene flakes was 359.76 grams, indicating an oil weight loss of 17.28 grams (4.58 percent by weight). This value was compared to the results obtained with liquid and supercritical carbon dioxide solvent oil removal discussed below.

All of the experiments described below were performed in a 4 liter pressure vessel that was part of a recirculating closed loop carbon dioxide separation system similar to that shown in FIG. 2. In each case, the polyethylene flakes were enclosed in a stainless steel mesh cage and placed in the pressure vessel such that the flowing carbon dioxide solvent would tend to "fluidize" the flake bed, i.e., in every case flow was from the bottom to the top of the pressure vessel. In all cases the flow rate was approximately 0.5 liters of carbon dioxide per minute, and a total volume flow of 20 liters (5.3 pressure vessel volume exchanges) was used (40 minutes per run).

Example 1

Liquid Carbon Dioxide

Pressure vessel: 28° C., 1450 psia, $CO_2$ density 0.791 g/cc, liquid

Separator: 31° C., 800 psia, $CO_2$ density 0.144 g/cc, gas

Original flake weight: 240.640 grams

Final Flake weight: 229.532 grams

Weight oil removed from flakes: 11.108 grams (4.62% original flake weight)

Weight oil collected from separator: 10.9 grams (98.1% of oil removed)

Note that the oil weight loss from this sample matches that of the hydrocarbon solvent washed sample extremely well (4.58 percent versus 4.62 percent). These results indicate that all of the oil can be removed from the flakes with liquid carbon dioxide at the theoretical least volume of 5.3 volume exchanges. The flakes appeared clean, dry and free-flowing. The recovered virgin oil appeared clean and without contaminants.

Example 2

Supercritical Carbon Dioxide Fluid

Pressure vessel: 45° C., 2600 psia, $CO_2$ density 0.789 g/cc, supercritical fluid Separator: 31° C., 800 psia. $CO_2$ density 0.144 g/cc, gas Original Flake weight: 233.354 grams Final Flake weight: 221.653 grams Weight oil removed from flakes: 11.701 grams (5.01% original flake weight)

Weight oil collected from separator: 11.3 grams (96.6% of oil removed)

Note that the oil weight loss from this sample is slightly greater than that of the liquid carbon dioxide solvent and the hydrocarbon solvent samples. It appears that these somewhat more aggressive conditions extracted some additives from the polyethylene, such as processing aids, antioxidants, and low molecular weight polyethylene fractions. The recovered flakes and virgin oil appeared as before from the liquid carbon dioxide run, Example 1.

Example 3

Supercritical Carbon Dioxide Fluid

Pressure vessel: 75° C., 4700 psia, $CO_2$ density 0.788 g/cc, supercritical fluid Separator: 31° C., 800 psia, $CO_2$ density 0.144 g/cc, gas Original Flake weight: 235.768 grams Final Flake weight: 222.368 grams Weight oil removed from flakes: 13.400 grams (5.68% original flake weight)

Weight oil collected from separator: 12.9 grams (96.3% of oil removed)

Note that under these even more aggressive conditions, an even larger percentage weight loss from the polyethylene flakes was observed. The recovered flakes appeared as before, but this time the recovered oil appeared slightly opaque rather than clear, reinforcing the impression that low molecular weight components of the polyethylene had been extracted along with the oil.

It is also worth noting that on all the above three carbon dioxide separation examples the polyethylene flakes lost weight for some 8 to 16 hours after completion of the separation runs. Because this weight loss can only be due to outgassing of carbon dioxide, this clearly indicates that the plastic contained dissolved carbon dioxide and that at least 8 hours were required for it to diffuse out of the plastic. This dissolved gas might cause problems if injection molding of the recovered polyethylene were to be attempted before it had diffused away.

In order to further explore the carbon dioxide solubility and diffusion out of the plastic chips, a number of additional experiments were performed. A new sample of chips was used for these tests, so the oil contamination level was first determined as described earlier using organic solvent washing. The results from the solvent washing indicated that the average oil content on the chips was 3.76 percent by weight, a value slightly lower than that of the first batch of chips studied. Samples of the oily chips were then treated with liquid or supercritical carbon dioxide as described in the first three examples, except that in these experiments the weight of the chips after carbon dioxide treatment was carefully measured as a function of time for 48 hours. It was observed that the weight loss was essentially complete in 8 hours or less. The data were analyzed using a form of the diffusion equation as shown below:

$$Q_t = Q_o \exp(-t/\beta)$$

where $Q_t$ is the quantity of carbon dioxide remaining in the plastic after time t, $Q_o$ is the original amount of carbon dioxide dissolved in the plastic, and $\beta$ is the "time constant" for the diffusion process. For the sake of brevity, the results of the additional experiments are shown in the following table. In all cases, the experiments were conducted in the 4 liter pressure vessel described earlier. The separator 05 was maintained at 31° C. and 800 psia (gas), the flow rate was approximately 0.5 liters per minute, and in all cases the total carbon dioxide flow was 30 liters (8 pressure vessel volume exchanges). The data table gives the temperature and pressure for each example, the physical state (liquid or supercritical) of the carbon dioxide in the extraction vessel, 01, the weight percent oil removed from the plastic chips, the total percent by weight of the carbon dioxide dissolved in the plastic, and the value of the "time constant" $\beta$ for the carbon dioxide diffusion process out of the plastic for each example.

TABLE 1

Examples 4–11 Results

| Ex. No. | Temp. °C. | Press. psia | State | Weight % Oil | Wt. % $CO_2$ | $\beta$, minutes |
|---|---|---|---|---|---|---|
| 4 | 25 | 1000 | Liquid | 3.44 | 0.60 | 54 |
| 5 | 25 | 1000 | Liquid | 3.47 | 0.97 | 45 |
| 6 | 28 | 1450 | Liquid | 3.62 | 0.76 | 46 |
| 7 | 28 | 1700 | Liquid | 3.61 | 1.10 | 49 |
| 8 | 30 | 1700 | Liquid | 3.62 | 1.08 | 44 |
| 9 | 30 | 2000 | Liquid | 3.60 | 1.36 | 61 |
| 10 | 35 | 1700 | Super-critical | 3.84 | 1.49 | 55 |
| 11 | 35 | 2000 | Super-critical | 3.64 | 1.77 | 59 |

Several observations can be made from the data presented in the table above. First, the percent oil removed by the carbon dioxide agrees very well with that obtained by the organic solvent wash, which was 3.76 percent by weight. Secondly, the weight of carbon dioxide that diffuses into the plastic is a function of both the temperature and the pressure used in the process, and ranged as high as 1.77 percent by weight. This is certainly enough dissolved gas to cause problems in injection molding, if sufficient time is not allowed for the gas to diffuse out of the plastic. Finally, the observed time constant $\beta$ ranged between 44 and 61 minutes. If one allows the time t for the diffusion of the gas out of the plastic to be $8\beta$, which the diffusion equation predicts would correspond to 99.97 percent removal of the dissolved carbon dioxide, then the total time required would be from 6 to 8 hours. This time range agrees very well with experimental observations of the time required to complete the weight loss of the treated plastic samples.

The results presented in the examples confirm that shredded plastic from motor oil containers can be separated from the oil coating it. Both materials can be recovered for further use without contamination, and without creating a secondary waste stream. The preferred embodiment is the use of liquid carbon dioxide as the separating solvent. This solvent does not appear to extract any additives and/or low molecular weight components from the polyethylene, and would require the smallest capital investment and operating costs of the examples presented.

ALTERNATIVE EMBODIMENTS OF THE INVENTION

While all of the examples discussed used carbon dioxide as the separating solvent, other solvents could be successfully used for this purpose. Saturated aliphatic hydrocarbons such as methane, ethane, propane, butane, pentane, hexane and others would be acceptable separating solvents. Unsaturated aliphatic hydrocarbons including ethylene, propene, butene and others could also be used for this purpose. Saturated cycli, hydrocarbons including cyclopropane, cyclobutane, cyclopentane, cyclohexane, cyclooctane and others, and unsaturated cyclic hydrocarbons such as cyclobutene, cyclopentene, cyclohexene, etc. could be used. Aromatic hydrocarbons including benzene, toluene, the xylenes and others could also be employed for the oil-plastic separation. All of the above potential alternative solvents are flammable substances, and consequently their use would involve additional safety measures relative to the use of carbon dioxide. Furthermore, many of these, such as benzene, are harmful to humans and would present a danger to operators of the equipment.

Other possible solvents for the plastic-oil separation are halogenated solvents, including methylene chloride, chloroform, carbon tetrachloride, perchloroethylene, trichloroethylene, trichloroethane, and trichlorotrifluoroethane. Some of these substances are ozone depletors, many are potentially harmful to humans, and all are generally more expensive and less available than carbon dioxide.

Additional potential organic solvents that could be used include ketones such as acetone and methyl ethyl ketone, ethers such as diethyl ether and the glycol ethers, and alcohols such as ethanol, and isopropanol. Most of these substances, like the hydrocarbons, are flammable materials.

Many fixed gases such as helium, argon, xenon, and nitrogen could be used as potential solvents, but the conditions required to obtain the liquid and/or supercritical states would require low temperatures and high pressures that would be expensive to achieve.

What is claimed is:

1. A process for separating for recycling plastic containers contaminated with motor oil into motor oil and plastic, comprising the steps of:

contacting said plastic containers contaminated with said motor oil with carbon dioxide in the liquid or supercritical state, where the pressure of said carbon dioxide in the liquid or supercritical state is from about 800 to about 2000 psia and the temperature is from about 20 to about 35 degrees C. so as to dissolve said motor oil in said carbon dioxide but so as to not dissolve or leach out portions of said plastic;

separating said carbon dioxide in which a portion of said motor oil is dissolved from said plastic containers;

adjusting the temperature and pressure of said carbon dioxide sufficient to render said carbon dioxide a gas and to render said motor oil a liquid, thereby forming a two-phase system comprised of said carbon dioxide and said motor oil;

separating the resulting two-phase system into said carbon dioxide and said motor oil; and recovering said plastic containers and said motor oil wherein said motor oil is not contaminated with plastic and said plastic containers are in an oil-free state and suitable for recycling.

* * * * *